_United States Patent Office_

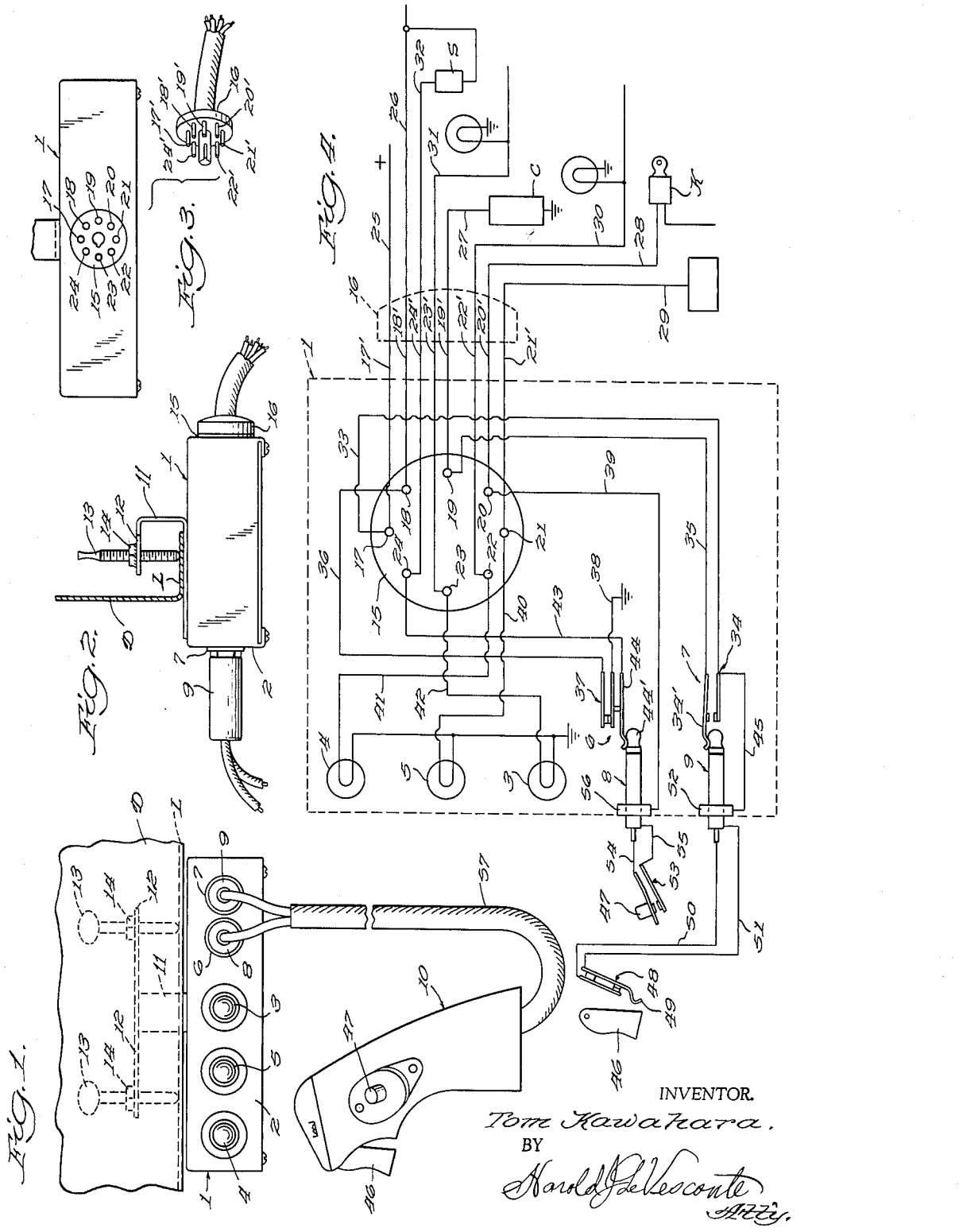

3,202,829
Patented Aug. 24, 1965

3,202,829
DUAL CONTROL DEVICE FOR MOTOR
VEHICLES
Tom Kawahara, 6320½ Heliotrope Ave., Bell, Calif.
Filed Oct. 31, 1961, Ser. No. 149,079
7 Claims. (Cl. 307—10)

This invention relates to motor vehicle control devices and more particularly to a motor stopping and starting means operable by an instructor seated alongside a student driver of a motor vehicle.

The principal object of the invention is to provide a means whereby an instructor in motor vehicle operation may sit beside the student driver and be able to start and stop the vehicle motor at will without recourse to the vehicle starting and stopping, key operated switch.

Another object of the invention is to provide a device of the above character in which, additionally, lights are included that are interposed in the turn signal light circuits of the vehicle and which are positioned directly in front of the instructor whereby he may know when and if the student has correctly indicated a turn without having to look laterally past the student to ascertain that fact.

Still another object of the invention is to provide an organized apparatus of the above character which may be readily installed and removed from the vehicle to be used for driving instruction, which does not interfere with the normal electric circuitry of the vehicle and which is effective for its intended purpose.

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings:

FIG. 1 is a front elevational view of the device as installed in the passenger compartment of the vehicle, a portion of a cable extending between a component of the invention which is mounted on the vehicle dash and a hand piece held by the instructor being broken away to conserve space in the drawing, FIG. 2 is a side elevational view of the portion of the device mounted on the vehicle dash as viewed from the right hand side of FIG. 1, FIG. 3 is an exploded rear view of the portion of the device shown in FIG. 2, and FIG. 4 is a circuit diagram of the device and its connection with the electrical system of the vehicle.

Referring to the drawings, the illustrated embodiment of the invention comprises a rectangular junction box or case 1 having a front face 2 carrying lights 3 and 4 connected in series with the right and left turn signal lights of the vehicle as will be later explained, a start indicating light 5 connected to the vehicle voltage regulator, and jack sockets 6 and 7 adapted to be detachably engaged by jack plugs 8 and 9, respectively, at one end of a flexible conductor assembly leading to a hand piece 10 and certain circuit operating instrumentalities carried by the hand piece, also later to be described in more detail.

The upper surface of the case 1 carries an upwardly and forwardly extending bracket member 11, the distal end of which terminates in opposed laterally extending arms 12, 12 each of which carries one each of a pair of thumb screws 13, 13 operable to clamp the case against the under side of the rearwardly extending ledge L of the vehicle dash D; said thumb screws engaging nuts 14, 14 welded to the ledge L.

The rear face of the case 1 carries an eight socket receptacle 15 having the various sockets thereof connected to various leads to be described and said receptacle being adapted to be detachably engaged by a complementary plug element 16 having the pin contacts thereof connected by leads to various portions of the vehicle electrical system. For convenience, the various pin receiving openings of the receptacle 15 will be designated as 17, 18, 19, 20, 21, 22, 23 and 24, starting at the top as viewed in FIG. 4 and moving clockwise. The complementary pin elements of the plug component 16 will be designated by the same numbers with the addition of the exponent "'."

Before going into the description of the circuitry within the case 1 and of the hand piece 10, the connections of the vehicle electrical system to the plug 16 will be described. The pin 17' is connected to a lead 25 leading to the battery or power source. The pin 18' is connected by a lead 26 to one side of the starting solenoid S. The pin 19' is connected by a lead 27 to the induction coil C. The pin 20 is connected by a lead 28 to the usual key operated starting switch K. The pin 21' is connected by lead 29 to the voltage regulator. The pin 22' is connected by a lead 30 to the left turn indicating signal light. The pin 23' is connected by a lead 31 to the right turn indicating signal light and the pin 24' is connected by a lead 32 to the opposite side of the solenoid S.

Within the case 1, the socket 17 is connected by a lead 33 to one side of a normally closed switch 34 forming a part of the jack socket 7, the other side of which is connected by a lead 35 to the socket 19. The socket 18 is connected by a lead 36 to one side of a normally open switch 37 forming a part of the jack socket 6, the other side of which is grounded at 38. The socket 20 is connected by a lead 39 to one side of the jack socket 6. The socket 21 is connected by a lead 40 to one side of the signal light 5. The socket 22 is connected by a lead 41 to the left turn signal light 4. The socket 23 is connected by a lead 42 to the right turn signal light 3, and the socket 24 is connected by a lead 43 to an operating leaf 44 of the switch 37 and through said operating leaf to one side 44' of the jack plug 8. The lead 33 in addition to being connected to one side of the switch 34 is also connected by a lead 45 to one side of the jack socket 9.

The hand piece 10 is of any convenient shape for ready grasping and for presenting switch operating members as 46 operable by the forefinger of the hand and 47 operable by the thumb of the hand holding the hand piece 10. Conveniently, this hand piece may be in the general configuration of a pistol grip to position the switch operating elements for ready operation by the forefinger and thumb of the head in which it is held. Within the hand piece a normally closed switch 48 is positioned with a spring leaf 49 thereof in sufficiently close proximity to the switch operating means to be caused to be opened by pressing on the trigger element 46 which is pivotally mounted in a slot in the hand piece 10. One side of this normally closed switch is connected by a lead 50 to the center pin of the jack plug 9 which upon being inserted into the socket 7 effects contact with the spring leaf of the switch 34 to open that switch as shown in FIG. 4. The other side of the switch 48 is connected by a lead 51 to the exterior contact means of the jack plug 9 which engages a conductive collar 52 of the jack socket and thence through the lead 45 effects electrical contact and connection with the lead 33. Thus when the jack plug 9 is inserted in the socket 7, the switch 34 is opened and current is constantly flowing to the leads 33 and 35 through the closed switch 48 and the leads 50 and 51. When the jack plug 9 is removed, the switch 34 closes to maintain connection between the leads 33 and 35.

The hand piece 10 further carries a normally open switch 53 adapted to be pressed into closed relation by pressure on the operating plunger 47 mounted for reciprocation in an opening in the hand piece. One side of the switch 53 is connected by a lead 54 to the center plug of the jack plug 8 and forms electrical connection with the spring leaf 44 of the switch 37. The other side of the switch 53 is connected by a lead 55 with the external surface of the jack plug 8 and upon insertion of the jack plug into the socket 6 effects electrical connection with the conductive collar 56 to which the lead 39 is connected. When the jack plug 8 is inserted in its socket closing the switch 37, the circuit which was open by that normally open circuit is now extended through the leads 54 and 55 to the normally open switch 53.

When the vehicle is running, current is flowing from the battery through leads 25, 33, 45, 51, switch 48, leads 50, switch contact 34' and leads 35 and 27 to the ignition coil C. When the instructor desires because of an emergency situation to stop the motor of the vehicle pressing inward on the trigger 46, opens the switch 48, and thus breaks the ignition circuit stopping the motor. When he wishes to start the motor again he presses in on the plunger 47 momentarily establishing the starting circuit which runs from the leads 26, 36, switch 37, spring contact 44, the center pin 44' of the jack plug 8, lead 54, switch 53, lead 55, plug contact 45 and leads 39 and 28 to the closed starter switch K, thus initiating the starting circuit.

Additionally, the placement of the signal lights 3 and 4 in the case 1 directly in front of the instructor makes it possible for him to observe whether or not the student has correctly given a turn signal without the necessity of the instructor looking sidewise to see whether or not the student has done so, and thus the instructor can both note the signal lights and observe the developing traffic situation.

The four leads, 50, 51, 54 and 55 extending between the jack plugs and the hand piece 10 can conveniently be united within a single flexible cable means 57 containing two pairs of conductors with one pair being associated with each of the jack plugs. When the car is not being used for instruction, removal of the hand piece and jack plugs effects closure of the switch 34 and the opening of the switch 37 thus maintaining the integrity of the vehicle electrical system.

While in the foregoing specification there has been disclosed a presently preferred embodiment of the invention, the invention is not to be deemed to be limited to the precise details thus disclosed by way of example and it will be understood that the invention includes as well all such changes and modifications in the parts and in the construction, combination and arrangement of parts as shall come within the purview of the appended claims.

I claim:
1. An auxiliary control means for starting and stopping the engine of a motor vehicle; said control means comprising
    a hand piece adapted to be held in the hand of an occupant of the vehicle other than the driver and having
    a normally open switch connected in parallel with the starter switch of the vehicle electrical system,
    a normally closed switch connected in series with the ignition coil of the vehicle electrical system
    and two independently manually operable devices for closing said normally open switch and for opening said normally closed switch, respectively, and
    a plurality of flexible electrical conductors extending between the terminals of said switches to the electrical system of the vehicle.

2. A vehicle engine control means as claimed in claim 1 in which
    said hand piece generally simulates a pistol grip in exterior configuration and houses said switches,
    in which said hand piece carries means adapted to be operated by the thumb of the user to close said normally open switch, and
    also carries a trigger like element adapted to effect opening of said normally closed switch.

3. A vehicle engine control means as claimed in claim 1 in which
    said control means includes a junction box mounted on the vehicle dash into which leads from the portions of the vehicle electrical system to be connected to said switches in said hand piece extend through a plug and socket connection,
    in which said junction box carries a pair of sockets, and
    in which said flexible conductors from each of said switches are connected to a corresponding pair of jack plugs insertable one each in each of said sockets for connection of the circuits extending through said switches with the complementary portions of the vehicle electrical system.

4. A vehicle engine control means as claimed in claim 1 in which
    said control means includes a pair of signal lamps connected in series with the turn signal means of the vehicle and positioned for observation by a driving instructor sitting beside a student driver operating the vehicle.

5. A vehicle engine control means as claimed in claim 3 in which
    the socket in said junction box which is engageable by the one of said jack plugs connected to said normally closed switch of said hand piece includes normally closed contact means effective when the jack plug is removed from the socket, to maintain the integrity of the circuit and adapted to be opened by insertion of the jack plug in the socket with resultant extension of the circuit through said normally closed switch.

6. A vehicle engine control means as claimed in claim 3 in which
    the socket in said junction box which is engageable by the one of said jack plugs connected to said normally open switch of said hand piece includes normally open contact means effective only when the jack plug is inserted in the socket, to be closed by such insertion with resultant extension of the engine starter solenoid circuit to opposite sides of said normally open switch in said hand piece.

7. A vehicle engine control means as claimed in claim 3 in which
    said junction box carries a pair of signal lamps connected in series with the turn signal means of the vehicle and positioned for observation by a driving instructor sitting beside a student driver operating the vehicle.

References Cited by the Examiner
UNITED STATES PATENTS

| | | | |
|---|---|---|---|
| 1,676,016 | 7/28 | Frost | 179—96 |
| 2,406,261 | 8/46 | Sprinkel | 192—83 |
| 2,591,618 | 4/52 | Schaeffer | 290—629 |
| 2,812,405 | 11/57 | Wolkov | 200—157 |

LLOYD McCOLLUM, *Primary Examiner.*